Nov. 29, 1938.   M. D. KENNEDY ET AL   2,138,174
FRUIT AND VEGETABLE TREATING MACHINE
Filed May 8, 1934   2 Sheets-Sheet 1
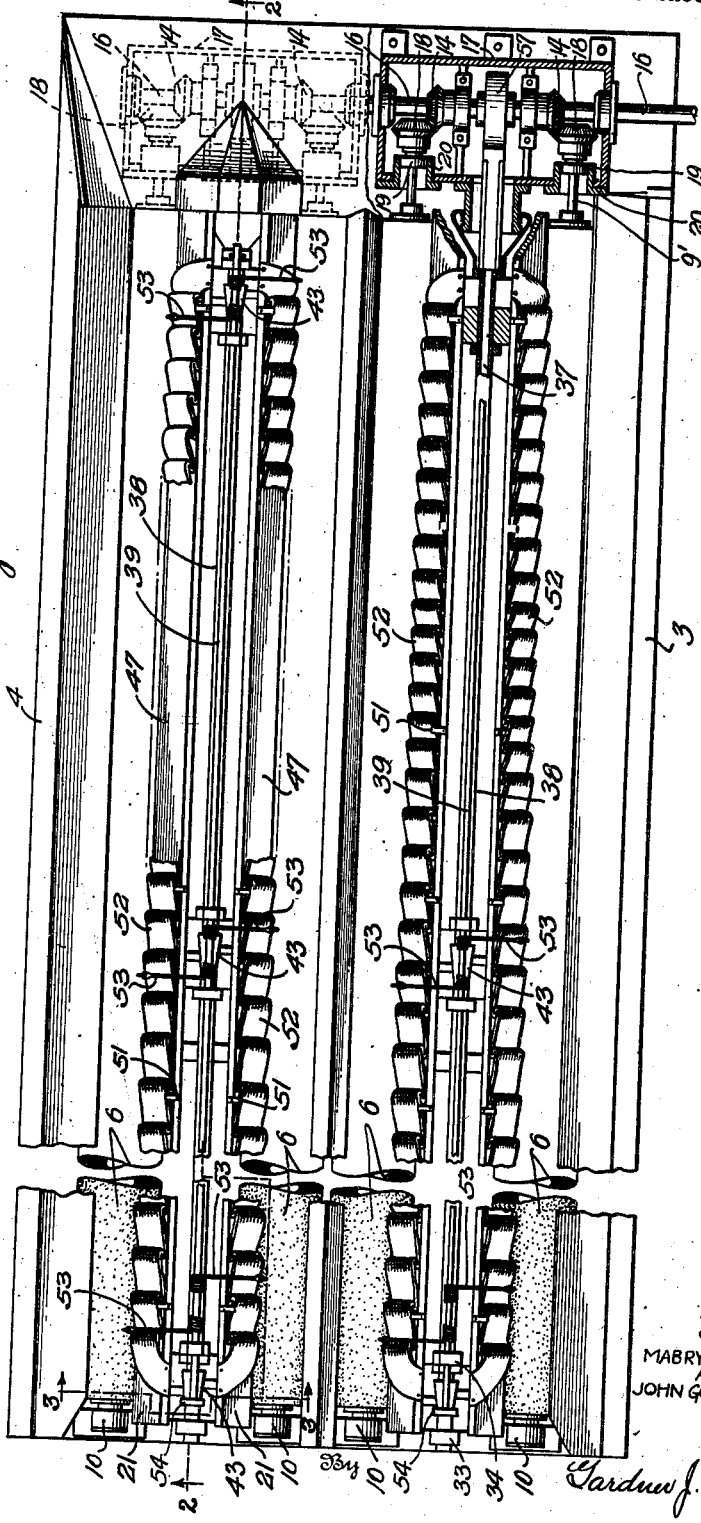
Inventors
MABRY D. KENNEDY
AND
JOHN GORDON JOHNSON
By Gardner J. O'Boyle
Attorney Nov. 29, 1938.    M. D. KENNEDY ET AL    2,138,174
FRUIT AND VEGETABLE TREATING MACHINE
Filed May 8, 1934    2 Sheets-Sheet 2
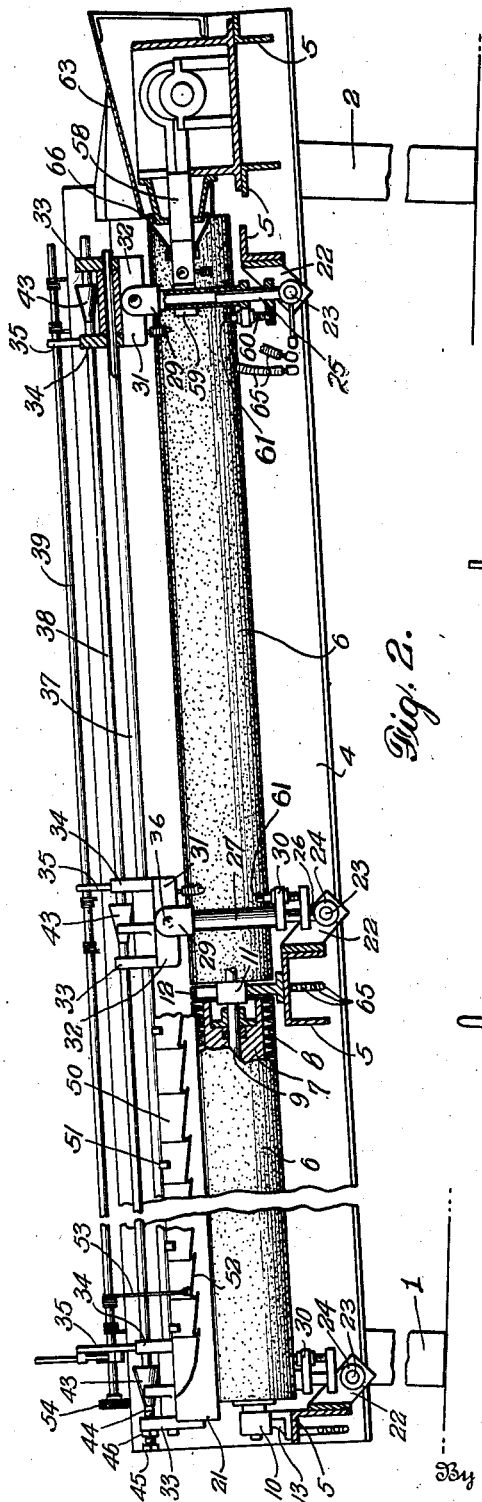
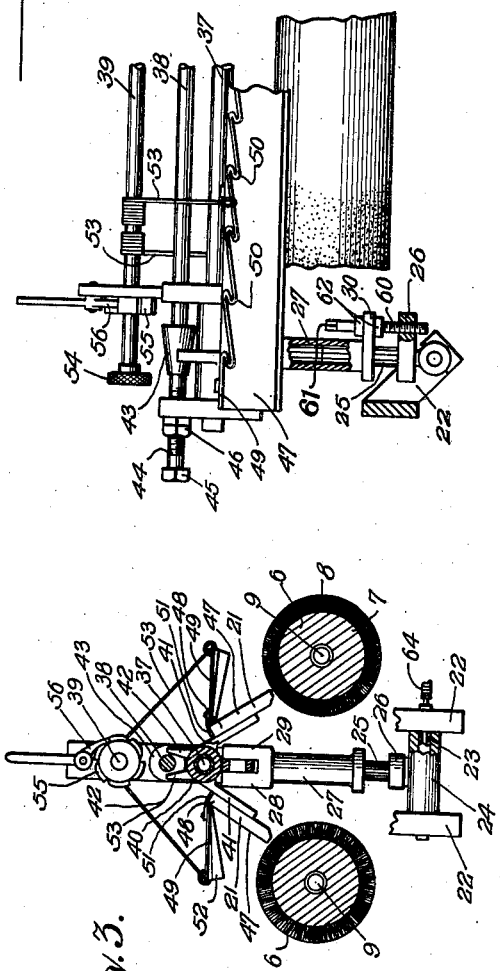
Inventors
MABRY D. KENNEDY
AND
JOHN GORDON JOHNSON
By Gardner J. O'Boyle
Attorney Patented Nov. 29, 1938

2,138,174

UNITED STATES PATENT OFFICE 2,138,174

FRUIT AND VEGETABLE TREATING MACHINE

Mabry D. Kennedy and John Gordon Johnson, Orlando, Fla.

Application May 8, 1934, Serial No. 724,595

15 Claims. (Cl. 146—202)

Our invention relates to fruit and vegetable treating machines and more particularly to washers and polishers of the ruffleboard type.

Heretofore, it has been proposed to clean and polish fruit by means of passing the fruit between rotating cylindrical brushes and in some of the prior art devices, reciprocating flat brushes are used in combination with cylindrical brushes. It has also been proposed to clean fruit by means of rubbing boards in combination with cylindrical rotating brushes wherein the boards are reciprocated with respect to the surfaces of the brushes.

One of the principal objections to the arrangements disclosed in the prior art devices, is that they do not permit proper and thorough washing and polishing of the fruit. It has been found that in some cases the fruit is merely turned about a single axis and in others, while the fruit has been rotated, it has also been damaged due to the pressure of the rubbing surface.

It is the purpose of our invention to provide an improved fruit or vegetable brushing or polishing machine wherein the fruit or vegetables are subjected to a thorough brushing during their passage through the machine. In our arrangement, the fruit moves longitudinally of the brushing means and is simultaneously rotated, the axis of rotation of each individual fruit being constantly changed so that every element of the surface of the fruit is repeatedly exposed to the brushing medium.

The invention, in its broadest aspect, comprises a plurality of rotating brushes or rolls, suitably mounted upon a supporting frame. The frame is inclined so that the fruit or vegetables undergoing treatment tend, under the force of gravity, to move lengthwise of the brushes. Adjacent the brushes and spaced therefrom are a plurality of rubbing boards adapted to have a rocking motion imparted thereto whereby the fruit or vegetables to be cleaned or polished are subjected to a thorough rubbing during their course of travel lengthwise of the brushes, and are propelled, by the combination of gravity and the ruffles, from the intake to the discharge end of the machine.

An object of our invention is to provide an improved ruffleboard type of fruit and vegetable treating machine, wherein the fruit and vegetables are subjected to a thorough brushing and scrubbing during their travel through the machine.

Another object of the invention is to provide means for adjusting the position and tension of the ruffle member with respect to the fruit passing under the ruffles.

Still another object of our invention is to provide means for adjusting the pitch of the ruffleboards, in relation to the cylindrical brushes, whereby the pitch of the boards may be adjusted from one point on the ruffleboard assembly.

Yet another object of the invention is to provide an improved suspension arrangement of the ruffleboard and rocker arm mechanism whereby the entire ruffleboard and rocker arm mechanism are supported at a point below and parallel to the center line of the cylindrical brushes.

A further object of our invention is to provide an improved fruit and vegetable treating machine of the ruffleboard type wherein the length of the rocker arm is adjustable so as to permit vertical adjustment of the ruffleboard assembly.

A still further object of this invention is to provide means of lifting the ruffles along the entire length of the machine, from a point at one end thereof, for the purpose of allowing residual fruit at the end of a run, which might otherwise remain under the ruffles, to pass out of the machine.

With these and other objects in view, which may be incident to our improvements, the invention consists in the parts and combinations to be hereinafter set forth and claimed, with the understanding that the several necessary elements, comprising our invention may be varied in construction, proportions and arrangement, without departing from the spirit and scope of the appended claims.

In order to make our invention more clearly understood, we have shown in the accompanying drawings means for carrying the same into practical effect, without limiting the improvements in their useful applications to the particular constructions, which for the purpose of explanation, have been made the subject of illustration.

In the drawings:

Figure 1 is a plan view, partly in section, of our improved ruffleboard machine.

Fig. 2 is a longitudinal section view along line 2—2 of Figure 1.

Fig. 3 is a sectional view along line 3—3 of Figure 1; and

Fig. 4 is an enlarged detail view, showing the ruffleboard adjusting mechanism.

Before proceeding with a detailed description of our invention, it may be stated that it consists essentially of a rectangular shaped bed or base mounted upon suitable supports and arranged so that it is slidably inclined from front to back, that is, it has a downward inclination from the point at which the fruit or vegetables are supplied to the point at which they exit. Intermediate of the ends of the machine are a plurality of cross members forming supports for the brushes, brush driving mechanism, ruffleboard rocker arm assembly and the eccentric used to impart motion to the rubbing mechanism.

Adjacent the brushes are a plurality of angular inclined rubbing boards having a fabric surface and provided with a ruffled piece of fabric attached to one edge of each board. The ruffleboards form, with the brushes, a plurality of paths for the fruit and when the brushes are rotated, a rocking motion is simultaneously imparted to the ruffleboards. The fruit, in passing along the paths formed between the brushes and the boards contacts with the brushes, the fabric surfaces of the rubbing boards and the ruffles. Due to the combination of motions imparted to the fruit, its axis of rotation is constantly changed with the resultant exposure of its entire surface to the rubbing surfaces.

Referring to the drawings and more particularly to Figures 1 and 2, the machine comprises support members in the form of legs 1 and 2 attached to the side pieces 3 and 4, extending lengthwise of the machine. Between the side pieces are a plurality of cross members 5, serving as supports for the rotary brushes, the brush drive mechanism and the eccentric used in connection with the ruffleboards.

The side pieces and cross members may be of any suitable construction, however, they are preferably formed of angle iron, the cross members being bolted or otherwise attached to the side pieces to form a strong and substantial bed or support for the fruit cleaning mechanism.

The brushes 6 are of conventional construction, each brush consisting of a cylindrical body portion 7 having bristles 8 attached thereto. The center of the brush body 7 is bored out to receive a brush shaft 9 which is supported on bearing members 10 and 11. The bearings 11 intermediate the ends of the machine are supported by bearing hangers 12 resting on the cross pieces 5 and forming a brush spacer. The ends of the brush shaft in the lower end of the machine are supported on bearings attached to brackets 13, which rest upon one of the cross members 5.

It will be understood that the brush arrangement consists of a number of brushes 6, extending lengthwise of the machine and supported at intervals of their length by means of hangers 12. While we have only shown an assembly of 4 brushes, it will be appreciated that the number of brushes may be increased and that the arrangement of the brushes is a matter of design to suit the particular requirements of a given machine.

In order to rotate the brushes, a suitable driving mechanism is provided at the upper end of the machine. This drive arrangement consists of a plurality of gears 14 mounted upon a common drive shaft 16. The drive shaft extends through the gear boxes 17 and is adapted to be driven from a source of power not shown. The end of each brush shaft 9 is formed with an extension 9' and provided with a gear 18 adapted to mesh with one of the gears 14 attached to the common drive shaft. The extensions 9' are also provided with bearing members 19 which seat in bearings 20 formed in the sides of the gear box.

Between and adjacent the brushes are a plurality of rubbing boards 21. The boards are mounted upon suitably spaced hangers attached to and supported by the cross members 5. Each hanger assembly for the ruffleboards consists of brackets 22 attached to the side members 5, a shaft 23 between the brackets and a sleeve 24 mounted upon shaft 23 and about which it is free to oscillate. Attached to this sleeve is a plunger 25, having a collar 26 permanently affixed thereto. Fitting down over plunger 25 is a hollow sleeve 27 formed with a bifurcated end having side members 28 and 29, the lower end of the sleeve being formed with a collar 30.

The ruffleboard assembly including the adjusting mechanism for the boards and ruffles, is attached to the sleeves 27 by means of support members in the form of brackets 31. These brackets comprise a base portion 32 and vertical portions 33 and 34, one of the vertical portions 34 being provided with an extension 35. The base 32 is adapted to be inserted in the bifurcated end of sleeve 27 and is held in position by means of a bolt or other suitable fastening means 36.

The vertical portions 33, 34 and extension 35 are provided with openings adapted to receive a longitudinally extending tube 37 and shafts or rods 38 and 39. The tube 37 which is the wing supporting tube, serves as a support for the wings to which the ruffleboards are attached. Referring to Figure 3, it will be seen that the wings comprise body portions 40 fitting around tube 37 and arms 41 and 42, the ruffleboards 21 being attached to the wing arms 41. Mounted upon the shaft 38 and at spaced intervals are a plurality of truncated cones 43, the cones being adapted to fit down between the arms 42 formed on the ruffleboard supporting wings. It will be noted that the arrangement of the wings is such that they are free to move about their pivotal point, that is, when arms 42 are forced apart, arms 41 are moved outwardly carrying ruffleboards 21 with them.

In order to vary the angular position of the wings with respect to their supports, the cones 43 are adapted to be moved longitudinally so that the arms 42 are spread apart. Referring to Figure 2, it will be seen that the rod or shaft 38, upon which the cones are mounted, may be adjusted longitudinally and that sufficient space between the vertical portions 32 and 33 is provided to allow clearance for the cones when they are moved in either direction between the vertical portions of brackets 31.

The adjusting arrangement for the wings, as herein disclosed, consists in tapping one of the vertical portions 33 at the lower end of the machine and threading the end of rod 38 as indicated by numeral 44. The end of the rod may be provided with a head 45 or other portion adapted to receive a wrench or other tool, whereby rod 38 may be turned. A lock nut 46 is also provided to lock the rod in position after adjustment of the wings has been made.

It will thus be seen that when it is desired to adjust the angular position of the ruffleboards, lock nut 46 is loosened, rod 38 turned, moving the rod longitudinally, the cones 43 moving between the arms 42, spreading the arms apart or allowing them to recede, depending upon the direction of rotation of the rod. After the wings have been adjusted, they are securely held in position by turning down the lock nut 46 against vertical portion 33.

The ruffleboards 21 are provided with canvas or other fabric surfaces 47 and to the upper edges 48 of each board is attached a piece of canvas or other fabric 49 which is formed with ruffles 50. The fabric 49 may be attached to the boards by means of members 51 which are in the form of flexible strips. The free edge 52 of the fabric is connected at spaced intervals of its length to flexible cords or chains 53. Referring again to Figure 3, it will be seen that the chains 53 are attached to the rod 39 and that when the rod is rotated by means of hand wheel 54, the chains are wrapped around the rod, thus raising the free edges of the fabric 49. In order to hold the free edge of the fabric out of contact with the fruit, a rachet 55 and pawl 56 are provided. After rod 39 has been rotated sufficiently to enable the ruffled portion of the fabric to clear the fruit, it is held in this position by means of pawl 56 which is adapted to engage with rachet 55. The purpose of this arrangement is to provide means for clearing the machine of fruit which may become lodged in the ruffles or pleats 50, as will be described more fully hereinafter.

For the purpose of imparting rocking motion to the ruffleboards through the medium of the rocker arm mechanism, a suitable eccentric is provided. The eccentric, designated generally by numeral 57, is of conventional construction, having a connecting rod 58. The rod is attached to one of the sleeves 27 at the upper or entrance end of the machine by means of a collar 59. The eccentric is associated with the common drive shaft 16 and motion is imparted to the rod 58 when shaft 16 is rotated. When the rod moves, it carries with it the sleeve 27, and since the sleeve is pivoted to shaft 23, the rocking motion of the rod is imparted to the sleeve and the ruffleboards are all moved in the same path through the medium of the rocker arms.

In order to adjust the rocker arms so as to permit vertical adjustment of the entire ruffleboard assembly, in relation to the cylindrical brushes, collars 26 formed on plunger 25 are tapped and a threaded stud 60, having head 61, adapted to receive a wrench is turned down into the collar. The stud is provided with shoulder portions 62 and when the stud is turned, collar 30 together with the stud 27, is raised or lowered on the piston 25.

From the description of our machine, thus far, it will be seen that when the drive shaft 16 is rotated, brush shafts 9 are turned and with them the brushes 6. At the same time, eccentric 57 is actuated causing the rocker arm assembly to impart a rocking motion to the ruffleboards. In the operation of the machine, fruit is introduced on table 63 from which it passes to one of the paths formed between a brush and a rubbing board. Rotation of drive shaft 16 causes the brushes to rotate and simultaneously imparts a rocking motion to the ruffleboards. The fruit in its passage along the length of the machine is caught between the ruffles and the ruffleboards, the brushes tending to force the fruit against the surface of the ruffleboard due to their direction of rotation, namely, in the direction of the boards. The combined motions imparted to the fruit causes it to rotate about a constantly changing axis of rotation and as a result, each element of surface of an individual fruit contacts with the brush, the surface of the rubbing board and the ruffles, thus insuring a thorough cleansing or polishing of the fruit in its passage through the machine.

One of the important features of our invention resides in the novel lubricating system, which we have provided for the lower rocker arm bearing and the arrangement of a common oil or grease tight housing, enclosing the brush shaft gears and eccentric, permitting both the eccentric and gears to turn in a common supply of lubricant. It will be noted that the lower rocker arm bearing consisting of hollow tube 23 and sleeve 24 is lubricated by means of a pipe or tube 64 connected to hollow tube or rod 23 and a suitable supply of lubricant. It will be further noted that all of the bearing surfaces, that is, the bearings between rods 37 and 38 and vertical portions 33 and 34 are lubricated by means of flexible connections 65 which terminate in the side members of the machine, whereby a supply of lubricant may be forced through the tubes to the bearings.

In addition to the lubricating means provided for the bearing surfaces of the rocker arms, means are also provided for sealing the lubricant within the gear box comprising a flexible sleeve 66 made of leather or other similar material which is adapted to fit around the rod arm 58 and prevent the lubricant contained within the gear box from leaking out through the opening provided for the connecting rods.

It will be appreciated that in the normal operation of ruffleboard washers and polishers, several different kinds of fruit are handled, such as oranges, grapefruit, tangerines, lemons, limes, etc., which due to different texture of skin and other physical properties will require different amounts of scrubbing or brushing. With the machines of the prior art, it is not possible to vary the pressure applied by the ruffles to the fruit, and, therefore, of the fruit against the brushes, since the ruffle bears against the fruit with a fixed or determined pressure. By means of our arrangement, fruit treating machines of the ruffleboard type will be provided with adjustments whereby variable pressure may be applied to the fruit with resultant varying degrees of washing or polishing.

By means of our improved arrangement for lifting the free edge of the ruffle, the ruffle may be raised clear of the fruit permitting it to pass through the machine. This arrangement is of particular advantage when small quantities of fruit are being run through the machine or at the end of a run, when there is insufficient fruit along the brush to cause a steady movement down the length of the machine, or when the last fruit is being run, due to the fact that not all of the fruit will move through the machine since some of it is liable to be caught up between the ruffles or pleats and it is then necessary for the operator of the machine to force them out from beneath the ruffles.

While we have shown and described the preferred embodiment of our invention, we wish it to be understood that we do not confine ourselves to the precise details of construction herein set forth, by way of illustrations, as it is apparent that many changes and variations may be made therein, by those skilled in the art, without departing from the spirit of the invention, or exceeding the scope of the appended claims.

What is claimed is:

1. A fruit treating machine comprising a plurality of rotatable brushes, a plurality of rubbing boards adjacent the brushes, means to pivotally support the boards at points below the center line of the brushes, means to vary the angular position of the boards with respect to the brushes, means to adjust the boards vertically with respect to the brushes, means to rotate the brushes and means to reciprocate the rubbing boards in the pivotal supports whereby a rocking movement is imparted to said boards.

2. A fruit treating machine comprising a plurality of rotatable brushes, a plurality of reciprocating rubbing boards adjacent the brushes, said boards having a fabric surface adapted to contact with the fruit, means to pivotally support the boards at points below the center line of the brushes, means operable from one end of the machine to vary the angular position of the boards with respect to the brushes, means to adjust the boards vertically with respect to the brushes, means to rotate the brushes and means to reciprocate the rubbing boards on the pivotal supports whereby a rocking movement is imparted to said boards.

3. A fruit treating machine comprising a plurality of rotatable brushes, a plurality of reciprocating boards adjacent the brushes, said boards having one face provided with a piece of fabric and another piece of fabric attached along one edge of the board, leaving one edge of the fabric free, means to pivotally support the boards at points below the center line of the brushes, means operable from one end of the machine to vary the angular position of the boards with respect to the brushes, means to lift the free edge of the fabric attached to the boards, means to adjust the boards vertically with respect to the brushes, means to rotate the brushes and means to reciprocate the rubbing boards on the pivotal supports whereby a rocking movement is imparted to said boards.

4. A fruit treating machine comprising a plurality of rotatable brushes, a plurality of rubbing boards adjacent the brushes, means to pivotally support the boards at points below the center line of the brushes comprising a plurality of rocker arms, means to vary the angular position of the boards with respect to the brushes, means to adjust the boards vertically with respect to the brushes, means to rotate the brushes and means to reciprocate the rocker arms about their points of support whereby a rocking movement is imparted to the rubbing boards.

5. A fruit treating machine comprising a plurality of rotatable brushes, a plurality of rubbing boards adjacent the brushes, means to support the boards comprising a plurality of rocker arms pivotally mounted at points below the center line of the brushes, each rocker arm comprising a sleeve, a plunger fitted into said sleeve and means to connect the sleeve with the plunger, means operable from one end of the machine to vary the angular position of the boards with respect to the brushes, means to adjust the boards vertically with respect to the brushes, means to rotate the brushes and means to reciprocate the rocker arms about their points of support whereby a rocking movement is imparted to the rubbing boards.

6. A fruit treating machine comprising a plurality of rotatable brushes, a plurality of rubbing boards adjacent the brushes, and attached to pivotally mounted ruffleboard support wings, means to pivotally support the boards at points below the center line of the brushes, means to vary the angular position of the boards comprising a plurality of longitudinally movable cones adapted to force the boards outwardly when moved between the pivotally mounted wings to which the boards are attached, means to adjust the boards vertically with respect to the brushes, means to rotate the brushes and means to reciprocate the rubbing boards about their pivotal supports whereby a rocking movement is imparted to the boards.

7. A fruit treating machine comprising a plurality of rotatable brushes, a plurality of rubbing boards adjacent the brushes, means to pivotally support the boards comprising a plurality of rocker arms, each rocker arm comprising a sleeve and a plunger fitting into said sleeve, means to adjust the boards vertically with respect to the brushes comprising a collar attached to the sleeve, a collar attached to the plunger and a threaded stud permanently affixed to the collar on the sleeve, said stud being adapted to thread into the collar formed on the plunger whereby the position of the sleeve with respect to the plunger may be varied means to rotate the brushes and means to reciprocate the rocker arms about their points of support whereby a rocking movement is imparted to the rubbing boards.

8. In a fruit treating machine of the ruffleboard type, a support arrangement for the ruffleboard and ruffleboard adjusting mechanism, comprising a plurality of vertically adjustable rocker arms, brackets attached to the free ends of the rocker arms, said brackets supporting a plurality of shafts, one of said shafts supporting the ruffleboard, another shaft supporting the angular adjusting mechanism for the boards and a third shaft supporting the ruffle adjusting mechanism, the entire ruffleboard and rocker arm mechanism being supported at points below the center line of the brushes.

9. A fruit treating machine comprising a plurality of rotatable brushes, a plurality of rubbing boards adjacent the brushes and attached to pivotally mounted ruffleboard support wings, means to pivotally support the boards comprising a plurality of rocker arms, means to vary the angular position of the boards with respect to the brushes comprising a plurality of longitudinally movable cones adapted to force the boards outwardly when moved between the pivotally mounted wings to which the boards are attached, means to adjust the boards vertically with respect to the brushes, means to rotate the brushes and means to reciprocate the rocker arms whereby a rocking movement is imparted to the rubbing boards.

10. A fruit treating machine comprising a plurality of rotatable brushes, a plurality of rubbing boards adjacent the brushes and attached to pivotally mounted ruffleboard support wings, means to support the boards comprising a plurality of rocker arms pivotally mounted at points below the center line of the brushes, means to vary the angular position of the boards with respect to the brushes comprisng a plurality of longitudinally movable cones adapted to force the boards outwardly when moved between the pivotally mounted wings to which the boards are attached, means to adjust the boards vertically with respect to the brushes, means to rotate the brushes and means to reciprocate the rocker arms about their points of support whereby a rocking movement is imparted to the rubbing boards.

11. A fruit treating machine comprising a plurality of rotatable brushes, a plurality of rubbing boards adjacent the brushes and attached to pivotally mounted ruffleboard support wings, means to support the boards comprising a plurality of rocker arms pivotally mounted at points below the center line of the brushes, means to vary the angular position of the boards comprising a plurality of longitudinally movable cones adapted to force the boards outwardly when moved between the pivotally mounted wings to which the boards are attached, means to vary the length of the rocker arms whereby the boards may be adjusted vertically with respect to the brushes and means to rotate the brushes and reciprocate the rubbing boards.

12. A fruit treating machine comprising a plurality of rotatable brushes, a plurality of rubbing boards adjacent the brushes and attached to pivotally mounted ruffleboard support wings, means to pivotally support the boards comprising a plurality of rocker arms, each rocker arm comprising a sleeve, a plunger fitted into said sleeve and means to connect the sleeve with the plunger, means to vary the angular position of the boards with respect to the brushes comprising a plurality of longitudinally movable cones adapted to force the boards outwardly when moved between the pivotally mounted wings to which the boards are attached, means to adjust the boards vertically with respect to the brushes, means to rotate the brushes and means to reciprocate the rocker arms about their points of support whereby a rocking movement is imparted to the rubbing boards.

13. A fruit treating machine comprising a plurality of rotatable brushes, a plurality of rubbing boards adjacent the brushes and attached to pivotally mounted ruffleboard support wings, said boards having one face provided with a piece of fabric and another piece of fabric attached along one edge to an edge of the board, means to pivotally support the boards from a point below the center line of the brushes, comprising a plurality of rocker arms, each rocker arm comprising a sleeve, a plunger fitted into said sleeve, and means to connect the sleeve with the plunger, means to vary the angular position of the boards with respect to the brushes comprising a plurality of longitudinally movable cones adapted to force the boards outwardly when moved between the pivotally mounted wings to which the boards are attached, means to adjust the boards vertically with respect to the brushes, means to rotate the brushes and means to reciprocate the rocker arms about their points of support whereby a rocking movement is imparted to the rubbing boards.

14. A fruit treating machine comprising a plurality of rotatable brushes, a plurality of rubbing boards adjacent the brushes and attached to pivotally mounted ruffleboard support wings, said boards having one face provided with a piece of fabric and another piece of fabric attached along one edge to an edge of the board, leaving one edge of the fabric free, means to lift the free edge of the fabric, means to support the boards from a point below the center line of the brushes, comprising a plurality of rocker arms, each rocker arm comprising a sleeve, a plunger fitted into said sleeve, and means to connect the sleeve with the plunger, means to vary the angular position of the boards with respect to the brushes, comprising a plurality of longitudinally movable cones adapted to force the boards outwardly when moved between the pivotally mounted wings to which the boards are attached, means to adjust the boards vertically with respect to the brushes, means to rotate the brushes and means to reciprocate the rocker arms about their points of support whereby a rocking movement is imparted to the rubbing boards.

15. A fruit treatment machine comprising a plurality of rotatable brushes, a plurality of rubbing boards adjacent the brushes and attached to pivotally mounted ruffleboard support wings, said boards having one face provided with a piece of fabric and another piece of fabric attached along one edge to an edge of the board, leaving one edge of the fabric free, means to lift the free edge of the fabric, means to support the boards comprising a plurality of rocker arms, each rocker arm comprising a sleeve, a plunger fitted into said sleeve and means to connect the sleeve with the plunger, means to vary the angular position of the boards with respect to the brushes comprising a plurality of longitudinally movable cones, adapted to force the boards outwardly when moved between the pivotally mounted wings to which the boards are attached, means to adjust the boards vertically with respect to the brushes, comprising a collar attached to the rocker arm sleeve, a collar attached to the rocker arm plunger and a threaded stud permanently affixed to the collar on the sleeve, said stud being adapted to thread into the collar formed in the plunger, whereby the position of the sleeve with respect to the plunger may be varied, and means to rotate the brushes and reciprocate the rubbing boards.

MABRY D. KENNEDY.
J. GORDON JOHNSON.